Figure 1:
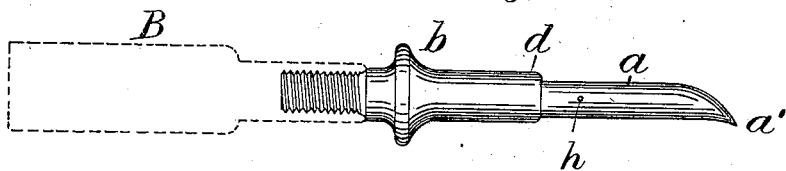

No. 737,719. PATENTED SEPT. 1, 1903.
W. D. DONOVAN.
MANUFACTURE OF PYROGRAPHIC BURNERS.
APPLICATION FILED DEC. 26, 1902.
NO MODEL.

Attest:
L. Lee.
Arthur F. Heaton.

Inventor.
William D. Donovan
per Thomas F. Crane, Atty.

No. 737,719. Patented September 1, 1903.

UNITED STATES PATENT OFFICE.

WILLIAM D. DONOVAN, OF NEWARK, NEW JERSEY.

MANUFACTURE OF PYROGRAPHIC BURNERS.

SPECIFICATION forming part of Letters Patent No. 737,719, dated September 1, 1903.

Application filed December 26, 1902. Serial No. 136,651. (No model.)

*To all whom it may concern:*

Be it known that I, WILLIAM D. DONOVAN, a citizen of the United States, residing at 15 Broad street, Newark, county of Essex, State of New Jersey, have invented certain new and useful Improvements in the Manufacture of Pyrographic Burners, fully described and represented in the following specification and the accompanying drawings, forming a part of the same.

The present invention relates to that class of pyrographic burners and cauterizing-tools which is provided with a tubular platinum tip and such tip heated by the combustion of gas within the tube. Heretofore such tubes have been secured to the shank of the burner by various methods, the most common of which is to fit the base of the tube over a cylindrical nozzle upon the shank and to lock the tube thereon by pressing a conical punch into the metal of the tube upon different sides of the shank to force a small projection from the interior of the tube into the shank. Such construction is cheap and simple; but as such platinum tubes are made very thin and the heat applied to the burner expands the tube the connection with the shank becomes loose and the pressure upon the point of the burner tends to strain such connection while the tube is heated, and thus operates to spread the end of the tube and loosen it still further. The loosening of the tube greatly impairs the usefulness of the burner, as the operator cannot exert such a firm touch when the burner-tube is loose upon its shank. The base of such a burner-tube has sometimes been clamped upon the shank by an exterior collar screwed to the exterior of the shank; but such construction is expensive.

The object of the present invention is to furnish a means of securing the base of the burner-tube to a nozzle upon the shank by means of a collar (so as to form a rigid and durable connection) without the expense of screwing a collar upon the shank. This object is attained by forming the shank at the forward end with a nozzle to fit inside the burner-tube and providing an integral collar around the base of the nozzle with a cylindrical groove adapted to receive the base of the burner-tube. If such groove be fitted exactly to the base of the tube, it prevents the expansion of the latter and effectively resists any lateral strains caused by pressure upon the point of the burner. The collar may be readily compressed upon the exterior of the tube to hold the same securely in the groove. The groove may be made a little larger than the thickness of the tube and the base of the tube flared outward slightly. With this construction the outer end of the collar may be pressed inwardly upon the tube without deforming the flared portion of the base, and the tube is thus positively locked in the groove. With the burner-tube thus secured upon the nozzle it is firmly held for a long period, the expansion of the tube being effectively resisted at the base by the encircling collar, so that pressure upon the point is incapable of loosening the tube. The groove is readily formed in the base of the nozzle by a suitable tubular milling-tool, and the collar is readily compressed upon the base of the burner-tube when inserted in the groove by a tapering tubular swage, and the whole article is thus manufactured by cheap and simple means.

The invention will be understood by reference to the annexed drawings, in which—

Figure 2:
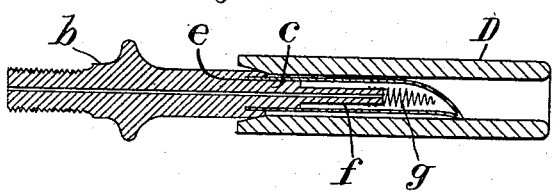
Figure 3:
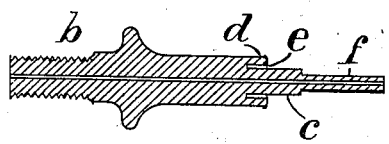
Figure 4:

Figure 1 is an outside view of a pyrographic point or burner. Fig. 2 is a longitudinal section of the same with the tubular swage applied to the collar, and Fig. 3 is a section of the shank without the burner-tube. Fig. 4 is a section of the burner-tube with modified base.

*a* designates the burner-tube, usually formed of thin platinum and having the operative point *a'*; *b*, the shank to which it is attached and which is usually supported by the handle B.

*c* designates the nozzle upon the end of the shank, to the exterior of which the base of the tube *a* is fitted.

*d* designates the collar, formed integral with the shank at the base of the nozzle, and *e* the cylindrical groove, formed within the collar around the nozzle.

*f* is the usual gas-tube, supplied with gas by a suitable connection through the handle B, the gas-tube being terminated with the heating-coil g, as is common.

The usual hole h is shown in the side of the burner-tube for the escape of the products of combustion.

In Fig. 2 the outer end of the collar is shown forced into close contact with the exterior of the burner-tube by the annular swage D, and if the groove e be made to fit the thickness of the tube such compression of the collar upon the metal serves to lock it very tightly to the nozzle c and holds it permanently from loosening under any strain upon the point a'.

In Fig. 3 the shank is shown without the burner and the groove e formed a little wider to admit the base of the burner-tube, (shown in Fig. 4,) which is slightly flared at the end where it is fitted within the groove. When such burner is placed in the groove and the swage applied to the outer end of the collar, the same is inclined upon the flaring end of the burner-tube and locks the same securely in the groove.

From the above description it will be understood that the invention includes the integral collar d, formed around the base of the nozzle c, and a cylindrical groove formed around the base of the nozzle within the collar, in which the base of the burner-tube may be inserted and locked therein by the compression of the collar.

Having thus set forth the nature of the invention, what is claimed herein is—

1. The pyrographic or cauterizing tool having a shank with nozzle upon the end, an enlarged collar at the base of the nozzle, the cylindrical groove within such collar, and the burner-tube having its base fitted to the nozzle and extended into such cylindrical groove.

2. The pyrographic or cauterizing tool having a shank with nozzle upon the end, an enlarged collar at the base of the nozzle, the cylindrical groove within such collar, and the burner-tube having its base fitted to the nozzle and extended into such cylindrical groove, and the collar compressed upon the base of the tube to lock it in the said groove.

3. The pyrographic or cauterizing tool having a shank with nozzle upon the end, an enlarged collar at the base of the nozzle, the cylindrical groove within such collar, and the burner-tube fitted over the nozzle and having a slightly-flaring base fitted into the said groove, with the edge of the collar compressed upon the tube to engage the flaring base.

In testimony whereof I have hereunto set my hand in the presence of two subscribing witnesses.

WILLIAM D. DONOVAN.

Witnesses:
L. LEE,
THOMAS S. CRANE.